(12) United States Patent
Parrao Alcantara et al.

(10) Patent No.: US 11,080,044 B1
(45) Date of Patent: Aug. 3, 2021

(54) SYSTEM, METHOD, AND GUI CLIENT FOR PUBLISHING NODE PACKAGE MANAGER (NPM) PACKAGES ON NPM REPOSITORY

(71) Applicant: HCL America, Inc., Sunnyvale, CA (US)

(72) Inventors: Manuel Sebastian Parrao Alcantara, Zapopan (MX); Cesar Ivan Orozco Cervantes, Zapopan (MX); Steve Russell Campbell, North Carolina, NC (US); Robert Harold Peterssen, North Carolina, NC (US)

( * ) Notice: Subject to any disclaimer, the term of this patent is extended or adjusted under 35 U.S.C. 154(b) by 0 days.

(21) Appl. No.: 16/983,076

(22) Filed: Aug. 3, 2020

(51) Int. Cl.
| | |
|---|---|
| *G06F 8/36* | (2018.01) |
| *G06F 8/71* | (2018.01) |
| *G06F 9/44* | (2018.01) |
| *G06F 11/36* | (2006.01) |
| *G06F 8/60* | (2018.01) |
| *G06F 9/445* | (2018.01) |
| *G06F 21/31* | (2013.01) |
| *G06F 3/0482* | (2013.01) |
| *G06F 9/451* | (2018.01) |

(52) U.S. Cl.
CPC .............. *G06F 8/71* (2013.01); *G06F 3/0482* (2013.01); *G06F 8/60* (2013.01); *G06F 9/451* (2018.02); *G06F 21/31* (2013.01)

(58) Field of Classification Search
CPC ..... G06F 8/71; G06F 8/60; G06F 8/77; G06F 8/36; G06F 9/451; G06F 9/45558; G06F 3/0482; G06F 21/31
See application file for complete search history.

(56) References Cited

U.S. PATENT DOCUMENTS

| | | | |
|---|---|---|---|
| 9,965,377 B1 * | 5/2018 | Russell | G06F 8/71 |
| 9,971,594 B2 | 5/2018 | Fox et al. | |
| 10,229,251 B1 | 3/2019 | Dalessio et al. | |
| 10,411,975 B2 | 9/2019 | Martinez et al. | |
| 2015/0220657 A1 | 8/2015 | Colgrave et al. | |
| 2019/0220777 A1 | 7/2019 | Johnson et al. | |

OTHER PUBLICATIONS

Qiu et al., Understanding Popularity Growth of Packages in JavaScript Package Ecosystem, 6 pages (Year: 2018).*

* cited by examiner

*Primary Examiner* — Thuy Dao
(74) *Attorney, Agent, or Firm* — Kendal Sheets

(57) ABSTRACT

A method of publishing node package manager (NPM) packages on NPM repository is disclosed. the method may include rendering a graphical user interface (GUI) client upon being launched by a user from within an integrated development environment (IDE). The GUI client may be configured to publish a NPM package created in the IDE on a target NPM repository. The method may further include receiving through the GUI client, an identification of the target NPM repository and corresponding user authentication information from the user, and a selection of the NPM package and a name of the NPM package upon receiving an acknowledgement for successful authentication from the target NPM repository. The method may further include transmitting the selected NPM package and the name of the NPM package to the target NPM repository for publication upon receiving an acknowledgement for successful validation from the target NPM repository.

20 Claims, 7 Drawing Sheets

SYSTEM, METHOD, AND GUI CLIENT FOR PUBLISHING NODE PACKAGE MANAGER (NPM) PACKAGES ON NPM REPOSITORY

TECHNICAL FIELD

This disclosure relates generally to Node Package Manager (NPM), and more particularly to a method, a system, and a graphical unit interface (GUI) client for publishing NPM packages on NPM repository.

BACKGROUND

Node Package Manager (NPM) is a package manager for the JavaScript programming language. It is the default package manager for the JavaScript runtime environment Node.js and include a command line client, also called NPM, and an online database of public and paid-for, private packages, called the NPM registry. The registry is accessed via the command line client, and the available packages can be browsed and searched via the NPM website. The package manager and the registry are managed by NPM, Inc.

In order to resolve packages by name and version, the NPM may interact with the registry website that implements the CommonJS Package Registry specification for reading package info. The NPM may be configured to use NPM Inc.'s public registry (for example, at https://registry.NPMjs.org) by default. Use of the NPM public registry may be subject to various terms of use. It may be possible to configure the NPM to use any compatible registry, or run one's own registry. Using someone else's registry may be governed by their terms of use. Further, the command 'NPM set registry "<% REGISTRY_DOMAIN %>"' may be used to switch between registries (public or private) to manage packages. The NPM's package registry implementation may support several write APIs to allow for publishing packages and managing user account information. The NPM public registry may be powered by a CouchDB database (a public mirror of which is available at https://skimdb.NPMjs.com/registry, and code for the couchapp is available at https://github.com/NPM/NPM-registry-couchapp).

In order to publish a package, a user must run the "NPM publish" command on the directory where the package resides. This command may publish a package to the registry so that it can be installed by name. It may be noted that if no local ".gitignore" or ".NPMignore" file exists, all of the files in the package directory are included. If both files exist and a file is ignored by ".gitignore" but not by ".NPMignore", then the file may be included. This reads the information on the package.json file. For example, the information required may include "Name", "Version", and "Main". "Main" is the path to the main JavaScript file that will be executed when the NPM package gets called.

As it will be appreciated by those skilled in the art, a user can develop NPM package using an Integrated development environment (IDE), for example, "Eclipse" IDE. To deploy the package, the user needs to leave the "Eclipse" IDE and use a command line tool (CLI). However, this is cumbersome for a user, as it requires the user to go back and forth between the environments, as well as possibly install additional software.

SUMMARY

In one embodiment, a method of publishing node package manager (NPM) packages on NPM repository is disclosed. The method may include rendering a graphical user interface (GUI) client upon being launched by a user from within an integrated development environment (IDE). The GUI client may be configured to publish a NPM package created in the IDE on a target NPM repository. The method may further include receiving, through the GUI client, an identification of the target NPM repository and corresponding user authentication information from the user. The corresponding user authentication information may be transmitted to the target NPM repository to authenticate the user. The method may further include receiving, through the GUI client, a selection of the NPM package and a name of the NPM package upon receiving an acknowledgement for successful authentication from the target NPM repository. The name of the NPM package may be transmitted to the target NPM repository for validation. The method may further include transmitting the selected NPM package and the name of the NPM package to the target NPM repository for publication upon receiving an acknowledgement for successful validation from the target NPM repository.

In another embodiment, a system for publishing NPM packages on NPM repository is disclosed. The system may include a processor and a memory communicatively coupled to the processor. The memory stores processor instructions, which when executed by the processor, cause the processor to render a GUI client upon being launched by a user from within an IDE, wherein the GUI client is configured to publish a NPM package created in the IDE on a target NPM repository. The processor instructions further cause the processor to receive, through the GUI client, an identification of the target NPM repository and corresponding user authentication information from the user. The corresponding user authentication information may be transmitted to the target NPM repository to authenticate the user. The processor instructions further cause the processor to receive, through the GUI client, a selection of the NPM package and a name of the NPM package upon receiving an acknowledgement for successful authentication from the target NPM repository. The name of the NPM package may be transmitted to the target NPM repository for validation. The processor instructions further cause the processor to transmit the selected NPM package and the name of the NPM package to the target NPM repository for publication upon receiving an acknowledgement for successful validation from the target NPM repository.

In yet another embodiment, a GUI client for publishing NPM packages on NPM repository is disclosed. The GUI client may be configured to receive an identification of the target NPM repository and corresponding user authentication information from the user. The corresponding user authentication information may be transmitted to the target NPM repository to authenticate the user. The GUI client may be further configured receive a selection of the NPM package and a name of the NPM package upon receiving an acknowledgement for successful authentication from the target NPM repository. The name of the NPM package may be transmitted to the target NPM repository for validation. The selected NPM package and the name of the NPM package may be transmitted to the target NPM repository for publication upon receiving an acknowledgement for successful validation from the target NPM repository.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
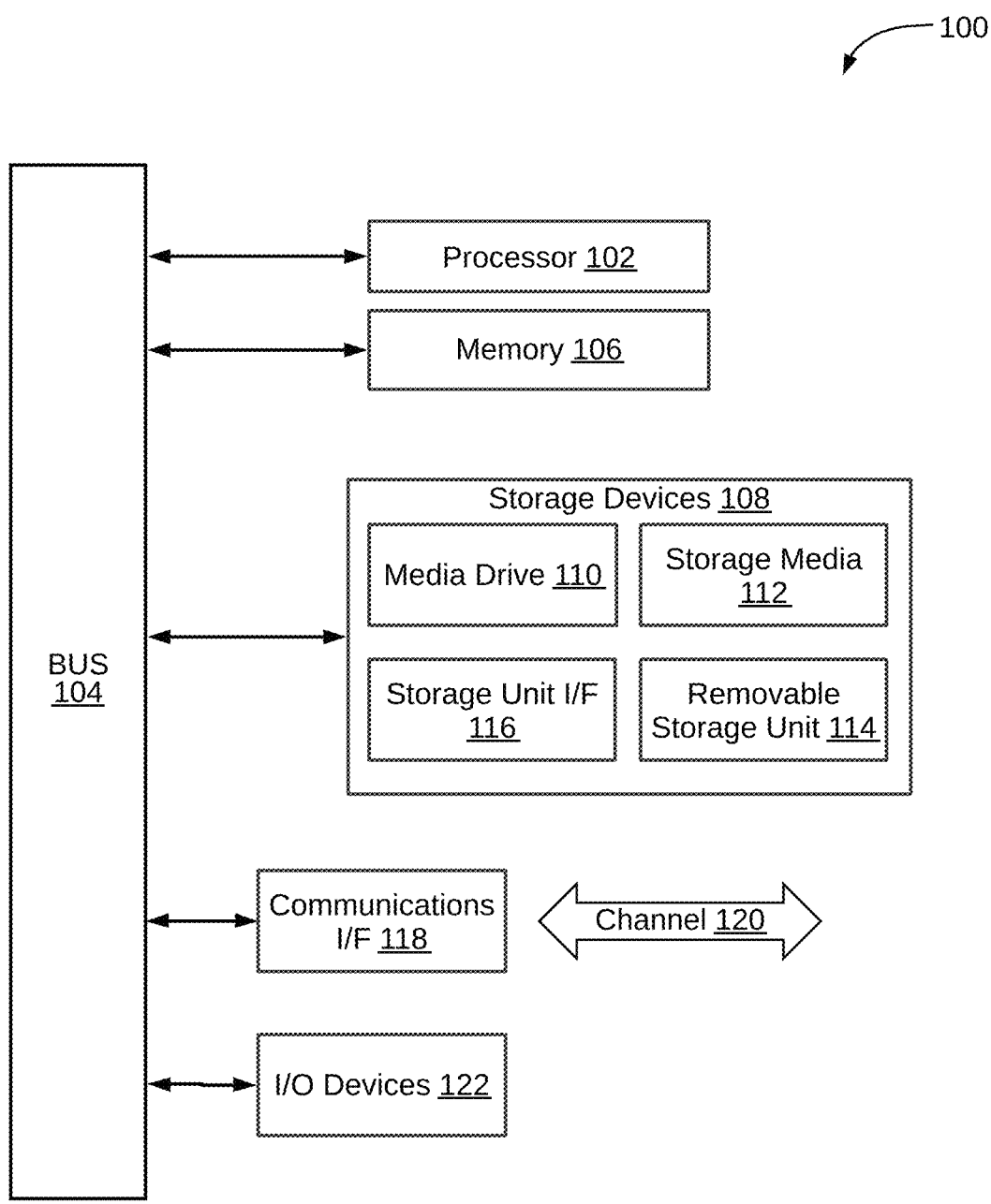
FIG. 1 is a block diagram of a computing system that may be employed to implement processing functionality for various embodiments.

Referring now to FIG. 1, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 100 may represent, for example, a user device such as a desktop, a laptop, a mobile phone, personal entertainment device, DVR, and so on, or any other type of special or general-purpose computing device as may be desirable or appropriate for a given application or environment. The computing system 100 may include one or more processors, such as a processor 102 that may be implemented using a general or special purpose processing engine such as, for example, a microprocessor, microcontroller or other control logic. In this example, the processor 102 is connected to a bus 104 or other communication medium.

The computing system 100 may also include a memory 106 (main memory), for example, Random Access Memory (RAM) or other dynamic memory, for storing information and instructions to be executed by the processor 102. The memory 106 also may be used for storing temporary variables or other intermediate information during execution of instructions to be executed by the processor 102. The computing system 100 may likewise include a read only memory ("ROM") or other static storage device coupled to bus 104 for storing static information and instructions for the processor 102.

The computing system 100 may also include a storage devices 108, which may include, for example, a media drive 110 and a removable storage interface. The media drive 110 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 112 may include, for example, a hard disk, magnetic tape, flash drive, or other fixed or removable medium that is read by and written to by the media drive 110. As these examples illustrate, the storage media 112 may include a computer-readable storage medium having stored therein particular computer software or data.

In alternative embodiments, the storage devices 108 may include other similar instrumentalities for allowing computer programs or other instructions or data to be loaded into the computing system 100. Such instrumentalities may include, for example, a removable storage unit 114 and a storage unit interface 116, such as a program cartridge and cartridge interface, a removable memory (for example, a flash memory or other removable memory module) and memory slot, and other removable storage units and interfaces that allow software and data to be transferred from the removable storage unit 114 to the computing system 100.

The computing system 100 may also include a communications interface 118. The communications interface 118 may be used to allow software and data to be transferred between the computing system 100 and external devices. Examples of the communications interface 118 may include a network interface (such as an Ethernet or other NIC card), a communications port (such as for example, a USB port, a micro USB port), Near field Communication (NFC), etc. Software and data transferred via the communications interface 118 are in the form of signals which may be electronic, electromagnetic, optical, or other signals capable of being received by the communications interface 118. These signals are provided to the communications interface 118 via a channel 120. The channel 120 may carry signals and may be implemented using a wireless medium, wire or cable, fiber optics, or other communications medium. Some examples of the channel 120 may include a phone line, a cellular phone link, an RF link, a Bluetooth link, a network interface, a local or wide area network, and other communications channels.

The computing system 100 may further include Input/Output (I/O) devices 122. Examples may include, but are not limited to a display, keypad, microphone, audio speakers, vibrating motor, LED lights, etc. The I/O devices 122 may receive input from a user and also display an output of the computation performed by the processor 102. In this document, the terms "computer program product" and "computer-readable medium" may be used generally to refer to media such as, for example, the memory 106, the storage devices 108, the removable storage unit 114, or signal(s) on the channel 120. These and other forms of computer-readable media may be involved in providing one or more sequences of one or more instructions to the processor 102 for execution. Such instructions, generally referred to as "computer program code" (which may be grouped in the form of computer programs or other groupings), when executed, enable the computing system 100 to perform features or functions of embodiments of the present invention.

In an embodiment where the elements are implemented using software, the software may be stored in a computer-readable medium and loaded into the computing system 100 using, for example, the removable storage unit 114, the media drive 110 or the communications interface 118. The control logic (in this example, software instructions or computer program code), when executed by the processor 102, causes the processor 102 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
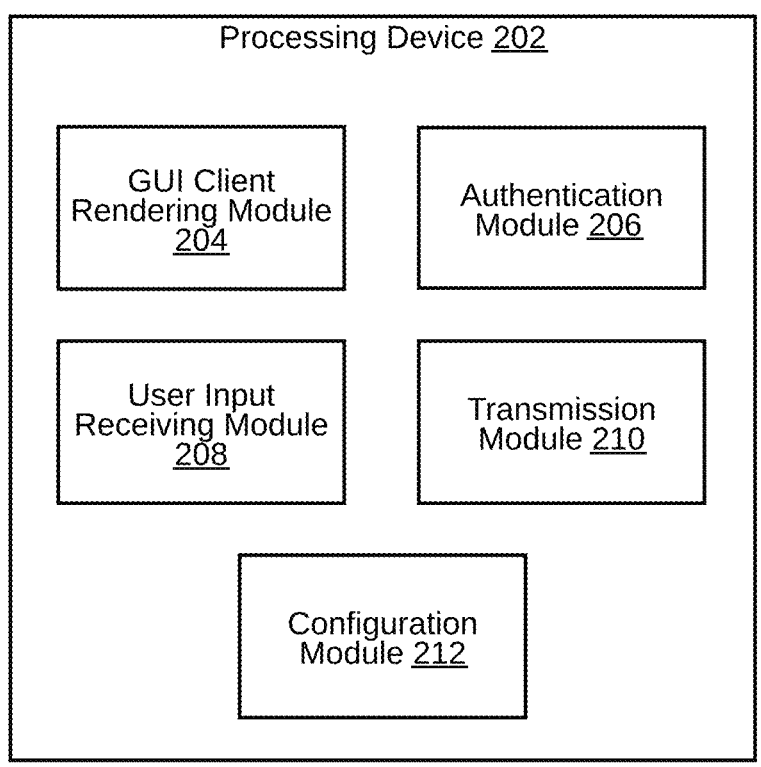
FIG. 2 is a functional block diagram of a processing device for publishing node package manager (NPM) packages on NPM repository, in accordance with an embodiment.

Referring now to FIG. 2, a functional block diagram of a processing device 202 for publishing node package manager (NPM) packages on NPM repository, is illustrated, in accordance with an embodiment. In some embodiment, the processing device 202 may be implemented for publishing NPM packages on a NPM repository using a graphical user interface (GUI) client without the need of a command line tool.

In some embodiments, the processing device 202 may render a GUI client upon being launched by a user from within an integrated development environment (IDE). The GUI client may be configured to publish a NPM package created in the IDE on a target NPM repository. The processing device 202 may further receive through the GUI client, an identification of the target NPM repository and corresponding user authentication information from the user. The corresponding user authentication information may be transmitted to the target NPM repository to authenticate the user. The processing device 202 may further receive through the GUI client, a selection of the NPM package and a name of the NPM package upon receiving an acknowledgement for successful authentication from the target NPM repository. The name of the NPM package may be transmitted to the target NPM repository for validation. The processing device 202 may further transmit the selected NPM package and the name of the NPM package to the target NPM repository for publication upon receiving an acknowledgement for successful validation from the target NPM repository.

In some embodiments, the processing device 202 may include a GUI client rendering module 204, an authentication module 206, a user input receiving module 208, a transmission module 210, and a configuration module 212.

The GUI client rendering module 204 may render a GUI client upon being launched by a user from within an IDE. It may be noted that the GUI client may be configured to publish a NPM package created in the IDE on a target NPM repository. In some embodiments, launching the GUI client may include activating a launch shortcut provided within the IDE. In some embodiments, the IDE may be "Eclipse". It may be noted that "Eclipse" may be used to create software. It may be further noted that "Eclipse" is mostly used for Java development and for other types of application development in different languages. "Eclipse" may include a main workspace environment with a rich set of built-in features/plugins and can be easily extended by providing additional installable plugins.

The authentication module 206 may receive through the GUI client, a corresponding user authentication information from the user. The corresponding user authentication information may be transmitted to the target NPM repository to authenticate the user.

The user input receiving module 208 may receive through the GUI client, an identification of the target NPM repository, from the user. The user input receiving module 208 may further receive through the GUI client, a selection of the NPM package and a name of the NPM package. It may be noted that the name of the NPM package may be transmitted to the target NPM repository for validation. It may be further noted that receiving the identification of the target NPM repository may include receiving a selection of the target NPM repository from a list of NPM repositories preconfigured in a database.

In some embodiments, in order to receive the name of the NPM package, the user input receiving module 208 may further receive through the GUI client, a selection of at least one of a suitable naming prefix from a list of naming prefixes and a suitable naming suffix from a list of naming suffixes for the target NPM repository. At least one suffix from the suitable naming prefix and the suitable naming suffix may be added to the name of the NPM package. Further, the list of naming prefixes or the list of naming suffixes may be preconfigured in a database for the target NPM repository.

In some embodiments, the user input receiving module 208 may further receive an identification of an NPM repository and at least one of a new naming prefix and a new naming suffix. The user input receiving module 208 may further add the new naming prefix to the list of naming prefixes for the NPM repository in the database. Alternately or additionally, the user input receiving module 208 may add the new naming suffix to the list of naming suffixes for the NPM repository in the database.

The transmission module 210 may transmit the selected NPM package and the name of the NPM package to the target NPM repository for publication upon receiving an acknowledgement for successful validation from the target NPM repository. The transmission module 210 may further automatically detect at least one required file for the NPM package. The at least one required file may include package.json file. The transmission module 210 may further automatically mark the at least one required file for transmitting as a part of the selected NPM package. It may be noted that the user may be disabled to unselect the at least one marked required file.

The configuration module 212 may receive through the GUI client, configuration information with respect to a new NPM repository. The configuration module 212 may further add the new NPM repository to the list of NPM repositories in the database based on the configuration information.

Figure 3:
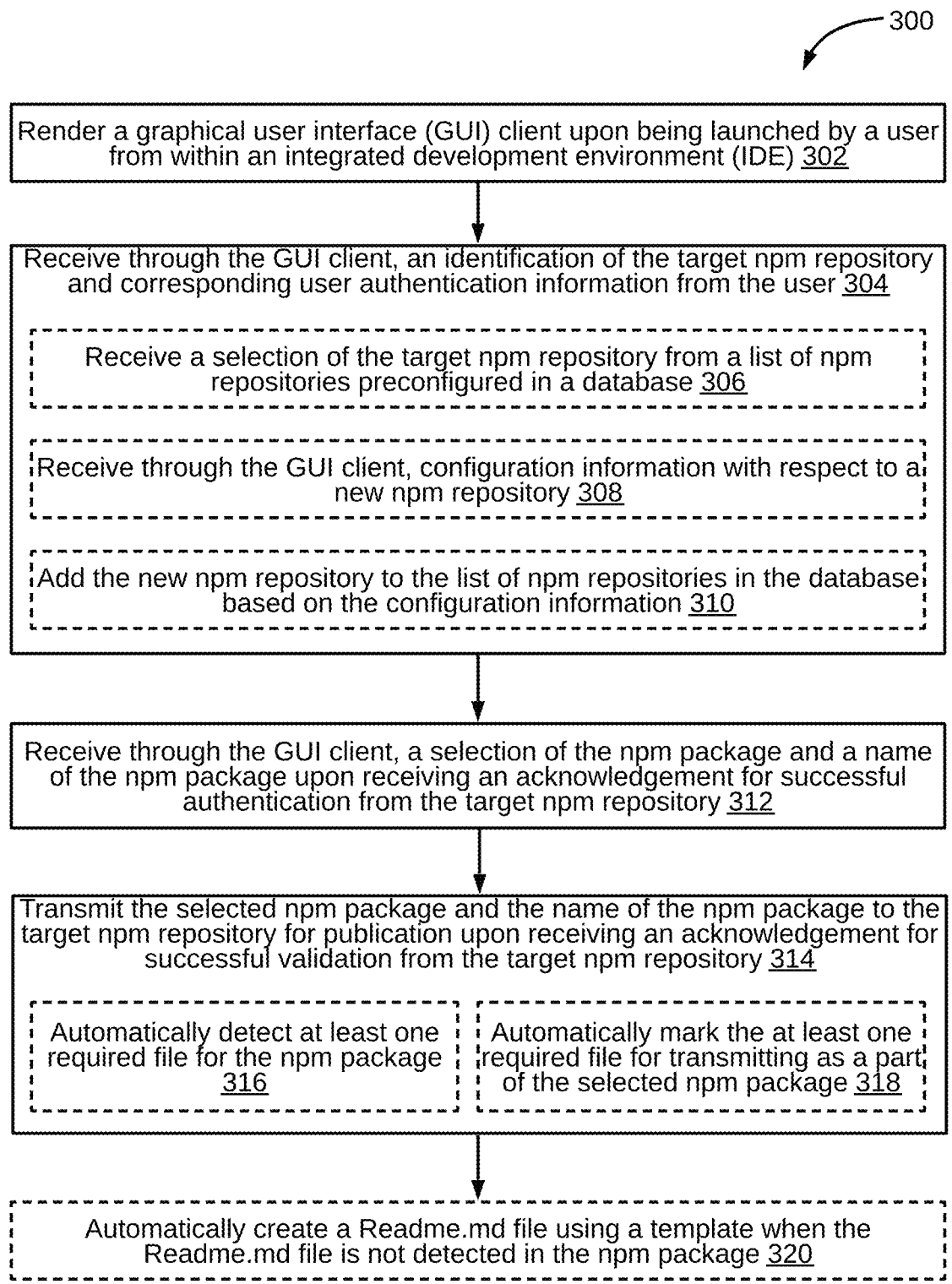
FIG. 3 is a flowchart of a method of publishing NPM packages on NPM repository, in accordance with an embodiment.

Referring now to FIG. 3, a flowchart of a method 300 of publishing NPM packages on NPM repository is illustrated, in accordance with an embodiment. In some embodiments, the method 300 may be performed by the processing device 202. At step 302, a GUI client, configured to publish a NPM package created in the IDE on a target NPM repository, may be rendered. By way of an example, first, the GUI client may be launched by a user from within an IDE. Upon being launched by the user, the GUI client may be rendered. At step 304, an identification of the target NPM repository and corresponding user authentication information may be received from the user, thorough the GUI client. It may be noted that the corresponding user authentication information may be transmitted to the target NPM repository to authenticate the user.

In some embodiments, receiving the identification of the target NPM repository may include receiving a selection of the target NPM repository from a list of NPM repositories preconfigured in a database. Therefore, at step 306, a selection of the target NPM repository from a list of NPM repositories preconfigured in the database may be received. In some scenarios, the target NPM repository may not be present in the list of NPM repositories. As such, in such scenarios, at step 308, configuration information with respect to a new NPM repository may be received through the GUI client. At step 310, the new NPM repository may be added to the list of NPM repositories in the database based on the configuration information.

At step 312, a selection of the NPM package and a name of the NPM package may be received through the GUI client, upon receiving an acknowledgement for successful authentication from the target NPM repository. The name of the NPM package may be transmitted to the target NPM repository for validation. The step 312 is further explained in detail in conjunction with FIG. 4.

At step 314, the selected NPM package and the name of the NPM package may be transmitted to the target NPM repository for publication upon receiving an acknowledgement for successful validation from the target NPM repository. In some embodiments, in order to perform the step 314, at least one of additional steps 316-318 may be performed. By way of an example, at step 316, at least one required file for the NPM package may be automatically detected. The at least one required file may include package.json file. At step 318, the at least one required file for transmitting as a part of the selected NPM package may be automatically marked. It may be noted that in such embodiments, the user may be disabled to unselect the at least one marked required file. Additionally, at step 320, a Readme.md file may be automatically created. it may be noted that the Readme.md file may be automatically created using a template when the Readme.md file is not detected in the NPM package. It may be noted that the Readme.md file is a common optional file that is used to describe the NPM package. For example, the Readme.md file may include general information, how to install instructions, and documentation.

Figure 4:
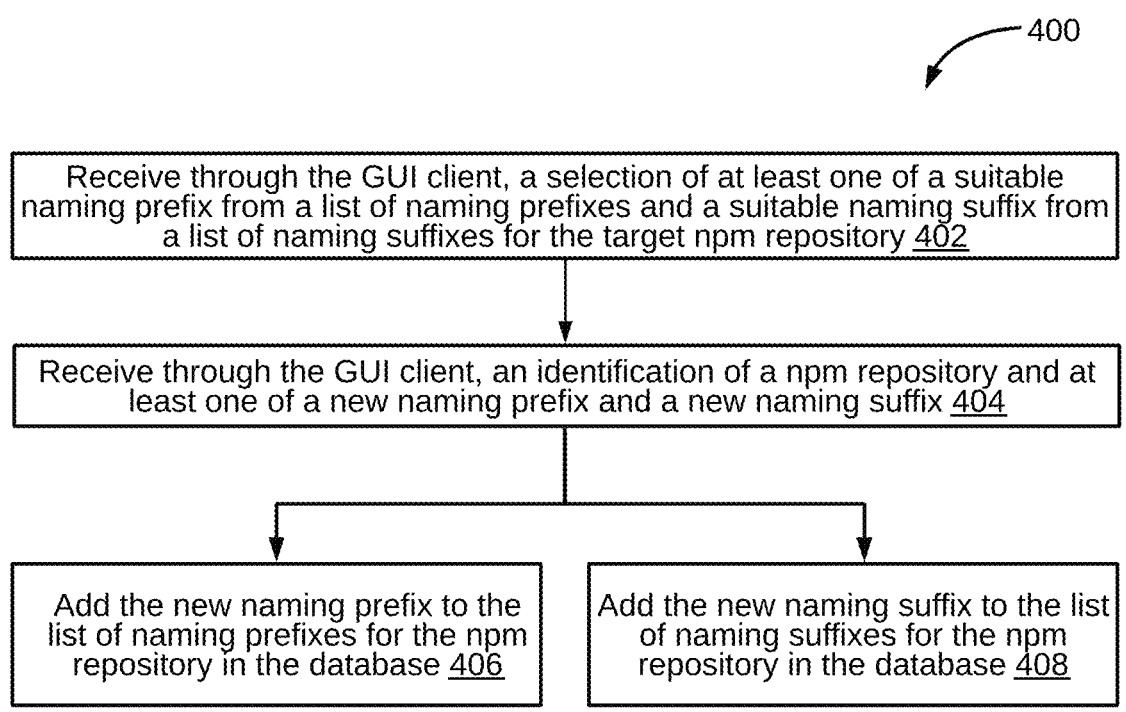
FIG. 4 is a flowchart of a method of receiving name of NPM package, in accordance with an embodiment.

Referring now to FIG. 4, a flowchart of a method 400 of receiving name of NPM packages is illustrated, in accordance with an embodiment. In some embodiments, the method 400 may be performed by the processing device 202. At step 402, a selection of at least one of a suitable naming prefix may be received from a list of naming prefixes and a suitable naming suffix from a list of naming suffixes for the target NPM repository. It may be noted that the selection of the at least one of a suitable naming prefix and the suitable naming suffix may be received through the GUI client. It may be further noted that the at least one of the suitable naming prefix and the suitable naming suffix may be added to the name of the NPM package. Further, at least one of the list of naming prefixes and the list of naming suffixes may be preconfigured in a database for the target NPM repository.

At step 404, an identification of a NPM repository and at least one of a new naming prefix and a new naming suffix may be received through the GUI client. Further, at step 406, the new naming prefix may be added to the list of naming prefixes for the NPM repository in the database. Additionally, or alternately, at step 408, the new naming suffix may be added to the list of naming suffixes for the NPM repository in the database.

Figure 5:
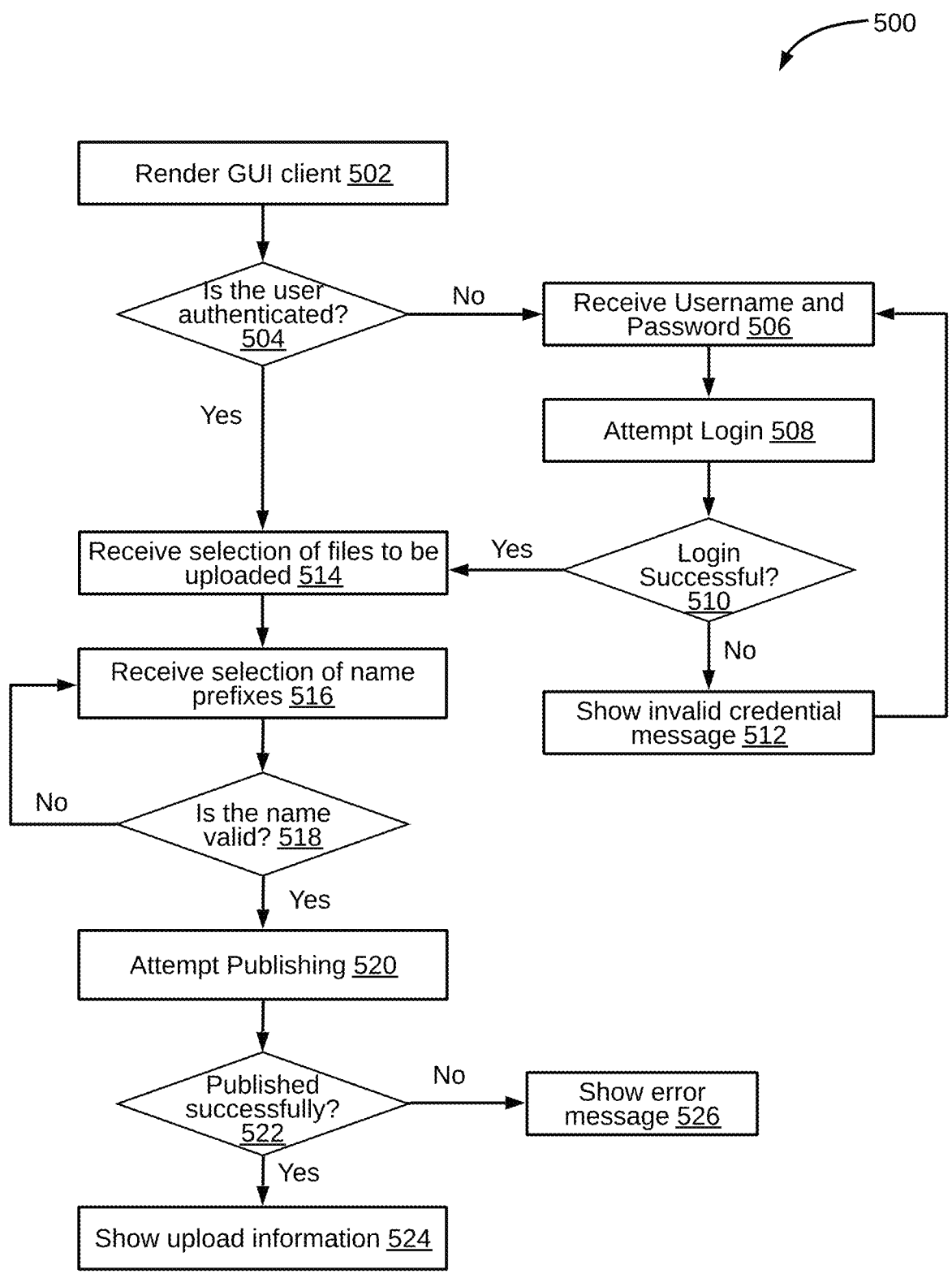
FIG. 5 is a flowchart of a method of publishing NPM packages on NPM repository, in accordance with another embodiment.

Referring now to FIG. 5, a flowchart of a method 500 of publishing NPM packages on NPM repository is illustrated, in accordance with another embodiment. At step 502, a GUI client may be rendered. For example, the GUI client may be first launched by a user from within an IDE, and upon being launched by the user, the GUI client may be rendered. At step 504, a check may be performed to determine if a user (for example, a user trying to publish NPM packages on NPM repository) is authenticated. If at step 504, it is determined that the user is authenticated, the method may proceed to step 514 ("Yes" path), where a selection of files to be uploaded (i.e. NPM packages to be published) may be received. However, if at step 504, it is determined that the user is not authenticated, the method may proceed to step 506 ("No" path) in order to authenticate the user.

At step 506, a username and a password may be received from the user. At step 508, a login may be attempted. At step 510 a check may be performed to determine if the login attempt is successful. If it is determined that the login attempt is successful, the method 500 may proceed to step 514 ("Yes" path). However, if it is determined that the login attempt is not successful, the method 500 may proceed to step 512 ("No" path). At step 512, an "invalid credential" message may be displayed. Accordingly, the method 500 may return to step 506 to again receive a username and a password from the user. The cycle of steps 506-512 may be repeated until the user is authenticated.

Once the user is authenticated, the method 500 may proceed to step 514, where, as mentioned before, a selection of files to be uploaded may be received. At step 516, a selection of name prefixes may be received. At step 518, a check may be performed to determine if the name is valid or not. If it is determined that the name is valid, the method 500 may proceed to step 520 ("Yes" path), where an attempt to publish the file and the file name (i.e. the selected NPM package and the name of the NPM package) may be made. However, if it is determined that the name is not valid, the method 500 may return to step 516 ("No" path), where a selection of name prefixes may be once again received. The cycle of steps 516-518 may be repeated until the name is determined to be valid. Once the name is determined to be valid, the method 500 may proceed to step 520, where, as mentioned earlier, an attempt to publish the file and the file name may be performed.

At step 522, a check may be performed to determine if the file is successfully published or not. If it is determined that the file is successfully published, the method 500 may proceed to step 524 ("Yes" path), where the uploaded information may be displayed. However, if it is determined that the file is not successfully published, the method 500 may proceed to step 526 ("No" path), where an error message may be displayed.

Figure 6A:
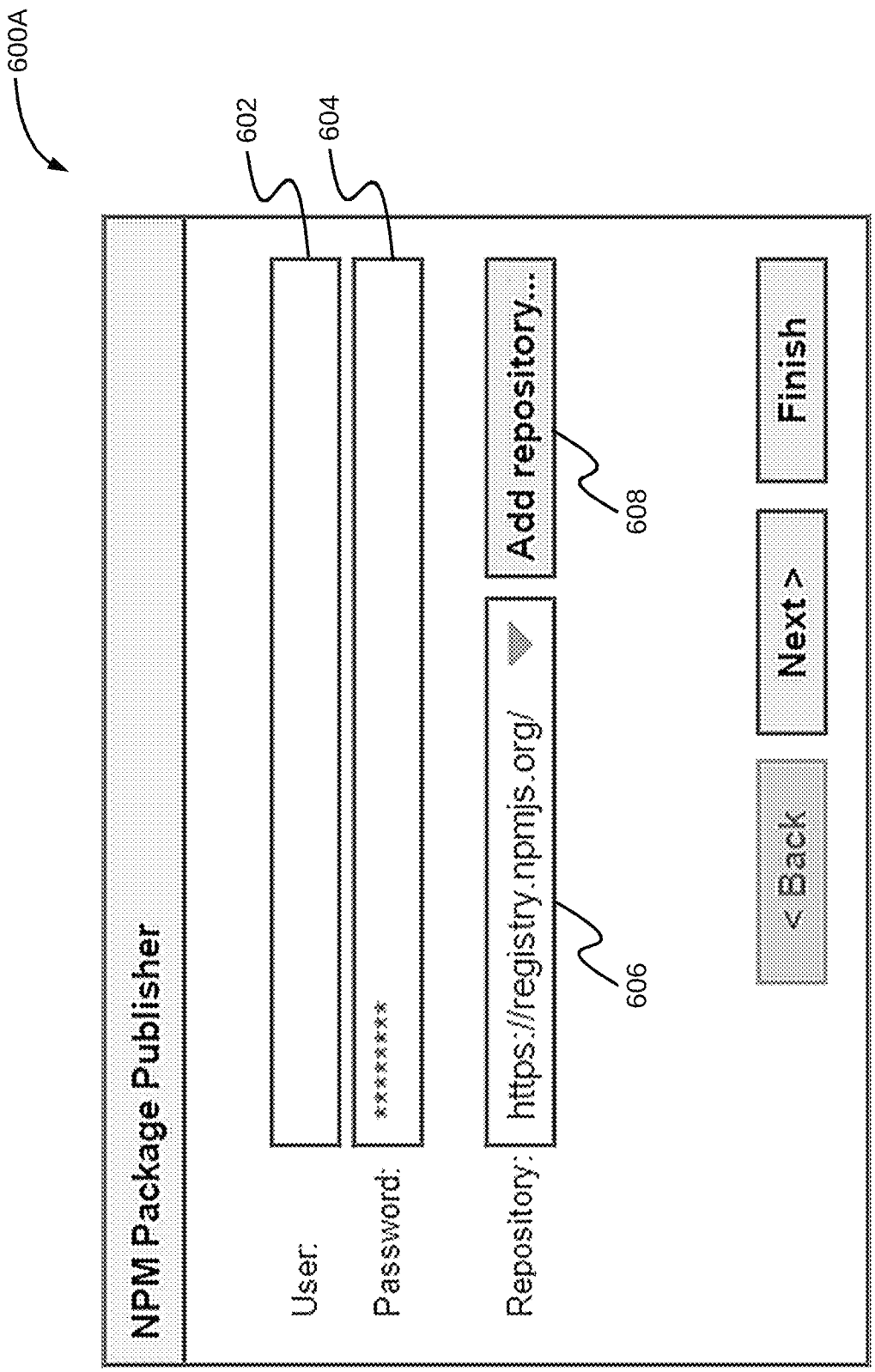
FIG. 6A-B illustrate a first GUI window and a second GUI window of a GUI client, respectively, for publishing NPM packages on NPM repository, in accordance with an embodiment.

Referring now to FIG. 6A, a first GUI window 600A of a GUI client for publishing a NPM package created in an IDE on a target NPM repository is illustrated, in accordance with an embodiment. As mentioned earlier, an identification of the target NPM repository and corresponding user authentication information may be received from the user, through the GUI client. By way of an example, the identification of the target NPM repository and the corresponding user authentication information may be received through the first GUI window 600A of the GUI client. To this end, the first GUI window 600A may include a "User" text field 602 and a "Password" text field 604. For example, during logging in the GUI client, in order to authenticate his/her identity, a user may enter his/her username and password in the "User" text field 602 and the "Password" text field 604, respectively.

In some embodiments, the first GUI window 600A of the GUI client may further include a "repository" selection dropdown button 606 for allowing the user to identify the target NPM repository. For example, upon clicking on the "repository" selection dropdown button 606, a list of NPM repositories in a database may be displayed. Further, in some embodiments, the first GUI window 600A of the GUI client may include an "Add repository" button 608 to allow the user to add a new NPM repository to the list of NPM repositories in the database.

Figure 6B:
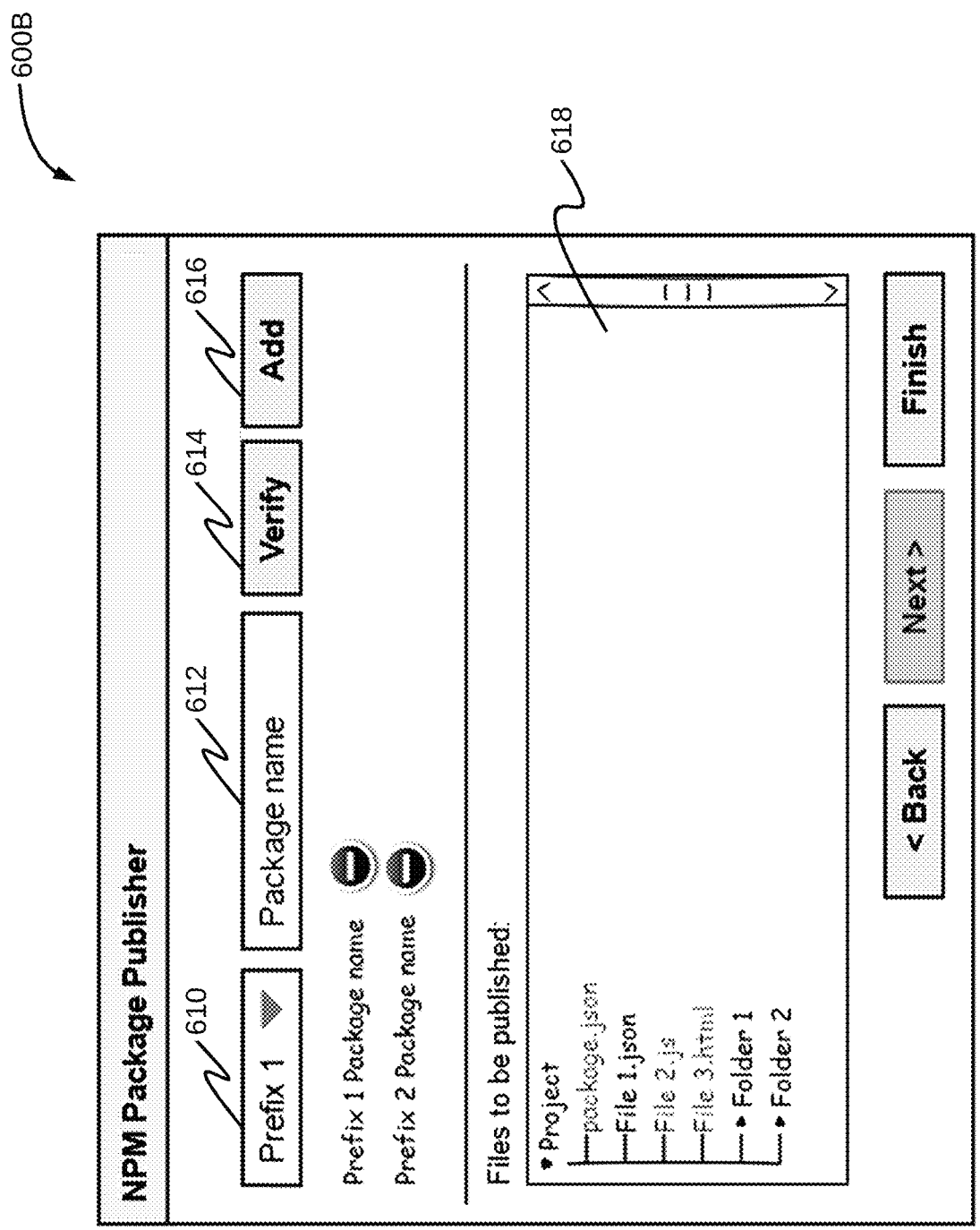

Referring now to FIG. 6B, a second GUI window 600B of the GUI client for publishing a NPM package created in an IDE on a target NPM repository is illustrated in accordance with an embodiment. As mentioned earlier, a selection of the NPM package and a name of the NPM package may be received through the GUI client, upon receiving an acknowledgement for successful authentication from the target NPM repository. By way of an example, the selection of the NPM package and the name of the NPM package may be received through the second GUI window 600B of the GUI client. To this end, the second GUI window 600B of the GUI client may include "Prefix" selection dropdown button 610. For example, upon clicking on the "Prefix" selection dropdown button 610, the list of naming prefixes may be displayed. A user may select a prefix from the list of naming prefixes. It may be noted that the list of naming prefixes may be preconfigured in a database for the target NPM repository.

Similarly, the second GUI window 600B of the GUI client may include "Suffix" selection dropdown button (not shown in FIG. 6B), such that upon clicking on the "Suffix" selection dropdown button, a list of naming suffixes may be displayed. The list of naming prefixes may be preconfigured in a database for the target NPM repository.

The second GUI window 600B of the GUI client may further include a "Package Name" text field 612 for receiving a name of the NPM package. In other words, the user may type the "Name" of the package in the "Package Name" text field 612. The second GUI window 600B may further include a "Verify" button 614 for allowing the user to verify the name of the package provided by the user. Upon clicking the "Verify" button 614, the GUI client may verify if the name of the package provided by the user is valid or not, for example, if such name already exists or if the format of such name is in order. The second GUI window 600B may further include an "Add" button 616. By way of an example, the "Add" button 616 may allow the user to add a new prefix or suffix to the list of the prefixes or the list of the suffixes, respectively. The second GUI window 600B may further include a display section 618 which may display the files which are to be published.

As will be appreciated by those skilled in the art, the above techniques relate to publishing NPM packages on NPM repository. The techniques allow a user to develop an NPM package within their "Eclipse" IDE and publish the NPM package on a repository, without requiring to use a command line tool (CLI). Further, the techniques provide for adding naming prefixes to the list of available prefixes. For example, an "Eclipse" extension point may create prefixes which will be available to be used as naming prefixes. It may be noted that one or more third party organizations (for example, Node-RED) are available that filter NPM packages based on the name convention. This allows the NPM package to be available on these organizations' websites.

The techniques further provide for adding repository URLs to the list of available registries. Again, an "Eclipse" extension point may be used to add repository URLs which will be available to be used by the application. It may be noted that the extension point is a mechanism to extend the capabilities of an existing "Eclipse" based product. Further, for users not familiarized the extension point, a button may be provided for directly adding a private or different registry and saving it into the local "Eclipse" preferences. The techniques further provide for selecting a repository to publish the package, to allow the users to publish the package to a desired NPM repository. The techniques further provide for detecting and creating a Readme.md markup file. The package files may be scanned to automatically create a new Readme.md file, if necessary, including template content.

The techniques further provide for creating a list of required files. An "Eclipse" extension point may be used to define a list of required files by using regular expressions on file names, and files defined in the package.json file. The techniques further provide for detecting and marking files as required. It may be noted that NPM packages may require, as a minimum, a package.json file. It may be further noted that the package.json file is a file that contains the name, description, version, and how to run the package information. This allows users to automatically select the required files, and also prevent users from being able to unselect them.

The techniques further provide for a launch shortcut to quickly publish a package. For example, the launch shortcut may be a sequence of keys, that is defined in "Eclipse" to allow launching of the tool (GUI client) to publish the package. This offers ease-of-use and accessibility considerations. Further, the launch shortcut will launch the tool based on the selection on the "Eclipse" workbench.

The specification has described method, system, and GUI client for publishing NPM packages on NPM repository. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of publishing node package manager (NPM) packages on NPM repository, the method comprising:

rendering, by a processing device, a graphical user interface (GUI) client upon being launched by a user from within an integrated development environment (IDE), wherein the GUI client is configured to publish a NPM package created in the IDE on a target NPM repository;

receiving, by the processing device and through the GUI client, an identification of the target NPM repository and corresponding user authentication information from the user, wherein the corresponding user authentication information is transmitted to the target NPM repository to authenticate the user;

receiving, by the processing device and through the GUI client, a selection of the NPM package and a name of the NPM package upon receiving an acknowledgement for successful authentication from the target NPM repository, wherein the name of the NPM package is transmitted to the target NPM repository for validation; and transmitting, by the processing device, the selected NPM package and the name of the NPM package to the target NPM repository for publication upon receiving an acknowledgement for successful validation from the target NPM repository.

2. The method of claim 1, wherein launching the GUI client comprises activating a launch shortcut provided within the IDE.

3. The method of claim 1, wherein receiving the identification of the target NPM repository comprises receiving a selection of the target NPM repository from a list of NPM repositories preconfigured in a database.

4. The method of claim 3, further comprising:
receiving, by the processing device and through the GUI client, configuration information with respect to a new NPM repository; and
adding, by the processing device, the new NPM repository to the list of NPM repositories in the database based on the configuration information.

5. The method of claim 1, wherein receiving the name of the NPM package comprises:
receiving, by the processing device and through the GUI client, a selection of at least one of a suitable naming prefix from a list of naming prefixes and a suitable naming suffix from alist of naming suffixes for the target NPM repository, wherein the at least one of the suitable naming prefix and the suitable naming suffix is added to the name of the NPM package, and wherein the at least one of the list of naming prefixes and the list of naming suffixes is preconfigured in a database for the target NPM repository.

6. The method of claim 5, further comprising:
receiving, by the processing device and through the GUI client, an identification of a NPM repository and at least one of a new naming prefix and a new naming suffix; and
at least one of:
adding, by the processing device, the new naming prefix to the list of naming prefixes for the NPM repository in the database; and
adding, by the processing device, the new naming suffix to the list of naming suffixes for the NPM repository in the database.

7. The method of claim 1, wherein transmitting the selected NPM package comprises, at least one of:
automatically detecting, by the processing device, at least one required file for the NPM package, wherein the at least one required file comprises package.json file; and automatically marking, by the processing device, the at least one required file for transmitting as a part of the selected NPM package, wherein the user is disabled to unselect the at least one marked required file.

8. The method of claim 1, further comprising:
automatically creating, by the processing device, a Readme.md file using a template when the Readme.md file is not detected in the NPM package.

9. A system for publishing node package manager (NPM) packages on NPM repository, the system comprising:
a processor; and
a memory communicatively coupled to the processor, wherein the memory stores processor instructions, which when executed by the processor, cause the processor to:
render a graphical user interface (GUI) client upon being launched by a user from within an integrated development environment (IDE), wherein the GUI client is configured to publish a NPM package created in the IDE on a target NPM repository;
receive, through the GUI client, an identification of the target NPM repository and corresponding user authentication information from the user, wherein the corresponding user authentication information is transmitted to the target NPM repository to authenticate the user;
receive, through the GUI client, a selection of the NPM package and a name of the NPM package upon receiving an acknowledgement for successful authentication from the target NPM repository, wherein the name of the NPM package is transmitted to the target NPM repository for validation; and
transmit the selected NPM package and the name of the NPM package to the target NPM repository for publication upon receiving an acknowledgement for successful validation from the target NPM repository.

10. The system of claim 9, wherein launching the GUI client comprises activating a launch shortcut provided within the IDE.

11. The system of claim 9, wherein receiving the identification of the target NPM repository comprises receiving a selection of the target NPM repository from a list of NPM repositories preconfigured in a database.

12. The system of claim 11, wherein the processing device instructions further cause the processing device to:
receive, and through the GUI client, configuration information with respect to a new NPM repository; and
add the new NPM repository to the list of NPM repositories in the database based on the configuration information.

13. The system of claim 9, wherein receiving the name of the NPM package comprises:
receiving, through the GUI client, a selection of at least one of a suitable naming prefix from a list of naming prefixes and a suitable naming suffix from a list of naming suffixes for the target NPM repository, wherein the at least one of the suitable naming prefix and the suitable naming suffix is added to the name of the NPM package, and wherein the at least one of the list of naming prefixes and the list of naming suffixes is preconfigured in a database for the target NPM repository.

14. The system of claim 13, wherein the processing device instructions further cause the processing device to:

receive, through the GUI client, an identification of a NPM repository and at least one of a new naming prefix and a new naming suffix; and at least one of:
- add the new naming prefix to the list of naming prefixes for the NPM repository in the database; and
- add the new naming suffix to the list of naming suffixes for the NPM repository in the database.

15. The system of claim 9, wherein transmitting the selected NPM package comprises, at least one of:
- automatically detecting at least one required file for the NPM package, wherein the at least one required file comprises package.json file; and
- automatically marking the at least one required file for transmitting as a part of the selected NPM package, wherein the user is disabled to unselect the at least one marked required file.

16. The system of claim 9, wherein the processing device instructions further cause the processing device to:
- automatically create a Readme.md file using a template when the Readme.md file is not detected in the NPM package.

17. A graphical user interface (GUI) client for publishing a NPM package created in an integrated development environment (IDE) on a target NPM repository, the GUI client configured to:
- receive an identification of the target NPM repository and corresponding user authentication information from the user, wherein the corresponding user authentication information is transmitted to the target NPM repository to authenticate the user; and
- receive a selection of the NPM package and a name of the NPM package upon receiving an acknowledgement for successful authentication from the target NPM repository, wherein the name of the NPM package is transmitted to the target NPM repository for validation, wherein the selected NPM package and the name of the NPM package is transmitted to the target NPM repository for publication upon receiving an acknowledgement for successful validation from the target NPM repository.

18. The GUI client of claim 17, wherein launching the GUI client comprises activating a launch shortcut provided within the IDE.

19. The GUI client of claim 17 further configured to receive configuration information with respect to a new NPM repository, for adding the new NPM repository to the list of NPM repositories in the database based on the configuration information.

20. The GUI client of claim 17, further configured to:
- receive a selection of at least one of a suitable naming prefix from a list of naming prefixes and a suitable naming suffix from a list of naming suffixes for the target NPM repository, wherein the at least one of the suitable naming prefix and the suitable naming suffix is added to the name of the NPM package, and wherein the at least one of the list of naming prefixes and the list of naming suffixes is preconfigured in a database for the target NPM repository; and
- receive an identification of a NPM repository and at least one of a new naming prefix and a new naming suffix, for at least one of:
  - adding the new naming prefix to the list of naming prefixes for the NPM repository in the database; and
  - adding the new naming suffix to the list of naming suffixes for the NPM repository in the database.

* * * * *